(12) United States Patent
Takeda (10) Patent No.: US 12,095,341 B2
(45) Date of Patent: Sep. 17, 2024

(54) ROTARY ACTUATOR

(71) Applicant: HARMONIC DRIVE SYSTEMS INC., Tokyo (JP)

(72) Inventor: Toru Takeda, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 387 days.

(21) Appl. No.: 17/629,077

(22) PCT Filed: Jul. 27, 2020

(86) PCT No.: PCT/JP2020/028629
§ 371 (c)(1),
(2) Date: Jan. 21, 2022

(87) PCT Pub. No.: WO2021/024825
PCT Pub. Date: Feb. 11, 2021

(65) Prior Publication Data
US 2022/0255400 A1    Aug. 11, 2022

(30) Foreign Application Priority Data
Aug. 2, 2019 (WO) .................. PCT/JP2019/030436

(51) Int. Cl.
*H02K 7/116* (2006.01)
*F16H 49/00* (2006.01)
(Continued)

(52) U.S. Cl.
CPC ........... *H02K 7/116* (2013.01); *F16H 49/001* (2013.01); *H02K 3/26* (2013.01); *H02K 7/083* (2013.01);
(Continued)

(58) Field of Classification Search
CPC .......... H02K 7/116; H02K 3/26; H02K 7/083; H02K 21/24; H02K 2203/03; H02K 16/00;
(Continued)

(56) References Cited

U.S. PATENT DOCUMENTS 5,899,658 A * 5/1999 Hofmeister ....... H01L 21/68707
414/744.5
2004/0100155 A1    5/2004 Sesselmann et al.
(Continued)

FOREIGN PATENT DOCUMENTS

JP     S498567 B1    2/1974
JP     S60144769 U   9/1985
(Continued)

OTHER PUBLICATIONS

International Search Report (PCT/ISA/210) with translation and Written Opinion (PCT/ISA/237) mailed on Oct. 6, 2020, by the Japan Patent Office as the International Searching Authority for International Application No. PCT/JP2020/028629. (13 pages).

*Primary Examiner* — Mohamad A Musleh
(74) *Attorney, Agent, or Firm* — BUCHANAN INGERSOLL & ROONEY PC (57) ABSTRACT

A rotary actuator includes a PWB motor and a wave gear drive. The PWB motor is an axial gap motor. A motor rotor in the PWB motor includes a rotor disk coaxially affixed to a hollow motor shaft and a rotor magnet affixed to the rotor disk. A motor stator is composed of a printed wiring board, and includes an insulating substrate and a motor coil defined by printed wiring formed on the insulating substrate. Compared with a conventional rotary actuator using an SPM motor or the like, the shaft length can be shortened and the hollow diameter thereof can be increased.

4 Claims, 7 Drawing Sheets

(51) Int. Cl.
  *H02K 3/26* (2006.01)
  *H02K 7/08* (2006.01)
  *H02K 21/24* (2006.01)

(52) U.S. Cl.
  CPC ......... *H02K 21/24* (2013.01); *H02K 2203/03* (2013.01)

(58) Field of Classification Search
  CPC .. H02K 2213/12; H02K 3/522; H02K 1/2793; H02K 3/345; H02K 11/21; H02K 1/27; H02K 3/34; H02K 5/04; H02K 7/003; F16H 49/001; F16H 57/021; F16H 2057/02034; F16H 35/00; F16H 57/023; F16H 2035/003
  See application file for complete search history.

(56) References Cited

U.S. PATENT DOCUMENTS

| | | | |
|---|---|---|---|
| 2011/0116962 A1* | 5/2011 | Kanayama | H02K 11/21 |
| | | | 418/191 |
| 2012/0187787 A1 | 7/2012 | Saito | |

FOREIGN PATENT DOCUMENTS

| | | | | |
|---|---|---|---|---|
| JP | H06791 B2 | | 1/1994 | |
| JP | H08321096 A | * | 12/1996 | |
| JP | 2001304382 A | | 10/2001 | |
| JP | 3231998 B2 | * | 11/2001 | ............. G11B 15/28 |
| JP | 2012157087 A | | 8/2012 | |
| JP | 2014011931 A | | 1/2014 | |
| WO | 2010089796 A1 | | 8/2010 | |
| WO | 2020050242 A1 | | 3/2020 | |

\* cited by examiner

ROTARY ACTUATOR

TECHNICAL FIELD

The present invention relates to a rotary actuator provided with a wave gear drive and a motor.

BACKGROUND ART

The hollow rotary actuators proposed in Patent Documents 1 and 2 are known as examples of rotary actuators provided with a wave gear drive and a motor. In the hollow rotary actuators disclosed in Patent Documents 1 and 2, a hollow motor and a hollow wave gear drive are coaxially linked, and a hollow section extends through an actuator central portion in the axial direction. Surface permanent magnet motors (SPM motors) are typically used as the motors in rotary actuators. SPM motors are revolving-field-type synchronous motors in which permanent magnets are affixed to the outer peripheral surface of a rotor attached to the outer peripheral surface of a hollow motor shaft.

Figure 7:
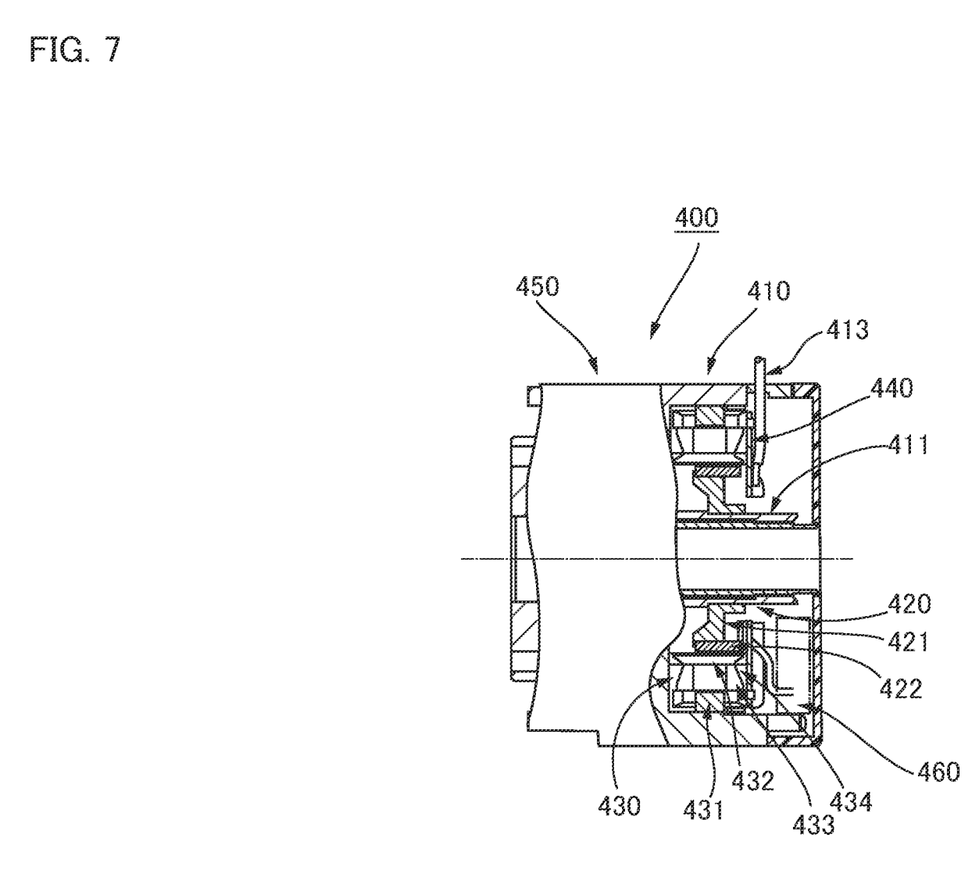
FIG. 7 is an explanatory diagram showing a hollow rotary actuator in the prior art.

FIG. 7 is an explanatory diagram showing a hollow rotary actuator provided with a wave gear drive and an SPM motor. The rotary actuator 400 is provided with an SPM motor 410 and a wave gear drive 450 that is coaxially linked thereto. The SPM motor 410 is additionally equipped with an encoder 460. The SPM motor 410 is moreover provided with a hollow motor shaft 411, a motor rotor 420 that is coaxially secured to the outer periphery thereof, and a motor stator 430 that coaxially surrounds the motor rotor 420. A motor wiring substrate 440 is disposed laterally from the motor rotor 420 and the motor stator 430.

The motor rotor 420 is provided with an annular rotor yoke 421 that is secured to the outer periphery of the hollow motor shaft 411, and a plurality of magnets 422 affixed to the outer peripheral surface of the rotor yoke 421. The motor stator 430 is provided with an annular stator core 431 that is a body made from layers of electromagnetic steel plates, a plurality of salient poles 432 formed along the inner peripheral surface thereof with a fixed angular spacing, and stator coils 433 configured from windings disposed on the salient poles 432. The stator coils 433 are covered by an insulator 434. In the motor wiring substrate 440, windings for each phase (e.g., three phases of U, V, and W) are hard-wired by soldering. In addition, a motor power line 413 drawn in from the exterior is attached to the motor wiring substrate 440 by solder hard-wiring.

PRIOR ART DOCUMENTS

Patent Documents

Patent Document 1: WO2010/089796
Patent Document 2: JP 2001-304382 A

SUMMARY OF THE INVENTION

Problems to be Solved by the Invention

A rotary actuator provided with a wave gear drive and a motor is, for example, incorporated into an industrial robot or another device as a power unit. Rotary actuators of short axial length, and those having both short axial lengths and large hollow diameters, are desired from the standpoint of, inter alia, reducing the size of the device.

An SPM motor used in a rotary actuator is provided with a motor stator having a configuration in which windings are formed on each of a plurality of salient poles formed on the inner peripheral surface of a stator core that is a body made from layers of electromagnetic steel plates and in which the windings are insulated, and a motor rotor having a configuration in which magnets are affixed to the outer peripheral surface of a ring-form rotor yoke, as described above. SPM motors have a relatively large number of components, a relatively large number of construction steps, and relatively high manufacturing costs. It is also necessary to use insulators having complicated shapes in order to insulate the windings of the salient poles. Furthermore, cogging torque is generated because electromagnetic steel plates are used in the motor stator.

SPM motors have windings on the outer periphery of the salient poles in the stator core, which is a body made from layers of electromagnetic steel plates. It is not easy for the salient poles to be orderly wound or for the winding space factor to be increased. Furthermore, it is necessary to perform work for hard-wiring of the windings for each phase after performing work for winding the windings onto the salient poles. For example, performing work for hard-wiring of three-phase windings of U, V, and W involves appreciable manual work, such as processes for removing coatings on conducting wires and work for solder hard-wiring, and requires skill to accomplish. It is also not easy to ensure the quality of the solder. Furthermore, because the power line is directly connected to the windings, individual motors need to be replaced when the power line is damaged.

It is an object of the present invention to provide a short-axial-length rotary actuator that is provided with a wave gear drive and a motor. It is also an object of the present invention to provide a hollow rotary actuator that has a large hollow diameter and that is provided with a wave gear drive and a motor.

Means of Solving the Problems

According to the present invention, there is provided a rotary actuator provided with a motor and a wave gear drive that is linked to the motor so as to reduce speed of output rotation of the motor and output the reduced-speed rotation, wherein an axial-gap-type motor provided with a motor shaft, and with a motor rotor and a motor stator that face each other across a fixed spacing in the direction of the central axis of the motor shaft, is used as the motor. The motor rotor is provided with a rotor disc that is coaxially secured to the motor shaft, and rotor magnets that are secured to the rotor disc. The motor stator is provided with an insulating substrate, and motor coils that are formed by printed wiring formed on the surface or interior of the insulating substrate.

In the hollow rotary actuator of the present invention, in addition to the configuration described above, a hollow motor shaft that extends through a central portion of the motor in the direction of the central axis is used as the motor shaft. The wave gear drive is provided with a drive hollow section that extends through the wave gear drive in the direction of the central axis, the drive hollow section communicating coaxially with the hollow section in the hollow motor shaft.

In the motor of the rotor actuator of the present invention, the motor stator is configured from a printed wiring board (PWB) provided with the insulating substrate and the motor coils that are configured by printed wiring formed on the surface or interior of the insulating substrate. The motor having this configuration is referred to below as a PWB motor. In the rotary actuator of the present invention, in which an axial-gap-type PWB motor is used, the axial length can be decreased and the hollow diameter can be increased to a greater extent than in a rotary actuator of the prior art, in which a radial-gap-type SPM motor is used.

MODE FOR CARRYING OUT THE INVENTION

Rotary actuators according to embodiments of the present invention are described below with reference to the accompanying drawings. The descriptions below are in no way intended to limit the embodiments of the present invention.

First Embodiment

Figure 1:
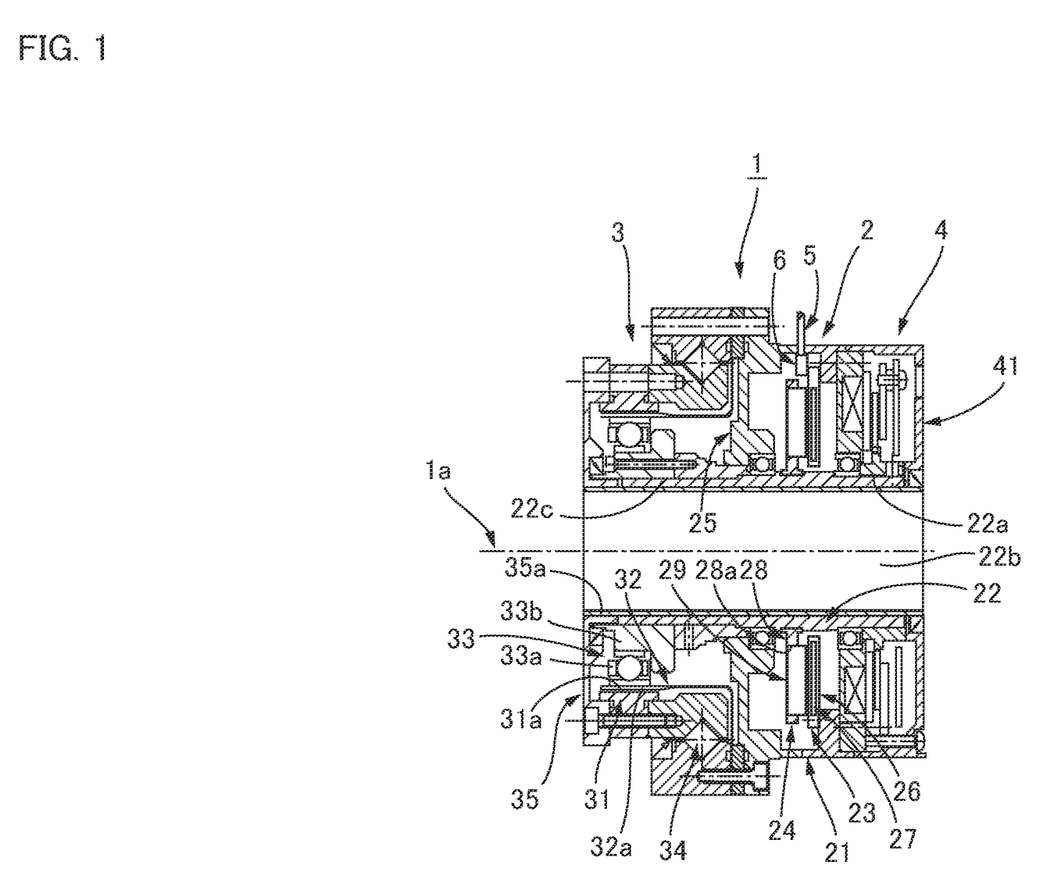
FIG. 1 is a longitudinal cross-sectional view showing a hollow rotary actuator according to first embodiment to which the present invention is applied.

FIG. 1 is a schematic longitudinal cross-sectional view showing a hollow rotary actuator according to first embodiment of the present invention. The rotary actuator 1 is provided with a PWB motor 2, a wave gear drive 3 that is linked to the PWB motor 2 so as to reduce speed of output rotation of the PWB motor 2 and output the reduced-speed rotation, and a rotary encoder 4 that detects rotation of the PWB motor 2.

The PWB motor 2 is an axial-gap-type motor and is provided with a cylindrical housing 21. A hollow motor shaft 22, a motor stator 23, and a motor rotor 24 are disposed inside the housing 21. The hollow motor shaft 22 is disposed coaxially inside the housing 21 via bearings in a state that allows rotation. The hollow motor shaft 22 extends through a central portion of the PWB motor 2 in the direction of a central axis 1a. The motor stator 23 and the motor rotor 24 face each other in parallel across a fixed spacing in the direction of the central axis 1a of the hollow motor shaft 22 in a state of coaxially surrounding the hollow motor shaft 22.

The rotary encoder 4 is disposed on a rear-side axial end section 22a of the hollow motor shaft 22. The rotary encoder 4 is covered by an encoder cover 41 attached to a rear-side open end of the housing 21. The rear end of the hollow motor shaft 22 passes through a central portion of the encoder cover 41, and a hollow section 22b of the hollow motor shaft 22 opens rearward. A front-side axial end section 22c that is the other axial end section of the hollow motor shaft 22 extends toward the wave gear drive 3 through a housing partition wall 25 located between the hollow motor shaft 22 and the wave gear drive 3 in a state that allows rotation.

The wave gear drive 3 is provided with a rigid internally toothed gear 31, a flexible externally toothed gear 32, and a wave generator 33. The externally toothed gear 32 has a "top hat" profile in the present example and is secured to the housing 21. The externally toothed gear 32 and the internally toothed gear 31 are retained in a state that allows relative rotation via bearings 34. The wave generator 33 is a rotation-inputting element, and is provided with a rigid plug 33a that is coaxially secured to the outer peripheral surface of the front-side axial end section 22c of the hollow motor shaft 22, and a wave bearing 33b that is fitted onto the ellipsoidal outer peripheral surface of the rigid plug 33a. The portion of the externally toothed gear 32 where external teeth 32a are formed is flexed in an ellipsoidal shape by the wave generator 33. The external teeth 32a thereby mesh with internal teeth 31a of the internally toothed gear 31 at positions at both long-axis ends of the ellipsoidal shape.

The internally toothed gear 31 is a reduced-speed rotation outputting element. A disc-form output shaft 35 is coaxially secured to the internally toothed gear 31. A central hole 35a in the output shaft 35 communicates coaxially with the hollow section 22b of the hollow motor shaft 22. A drive hollow section that extends through the central portion of the wave gear drive 3 is formed by the central hole 35a and the hollow portion of the axial end section 22c of the hollow motor shaft 22. Specifically, a hollow section that extends through the central portion in the direction of the central axis 1a and that opens at both ends is formed in the rotary actuator 1.

Figure 2A:
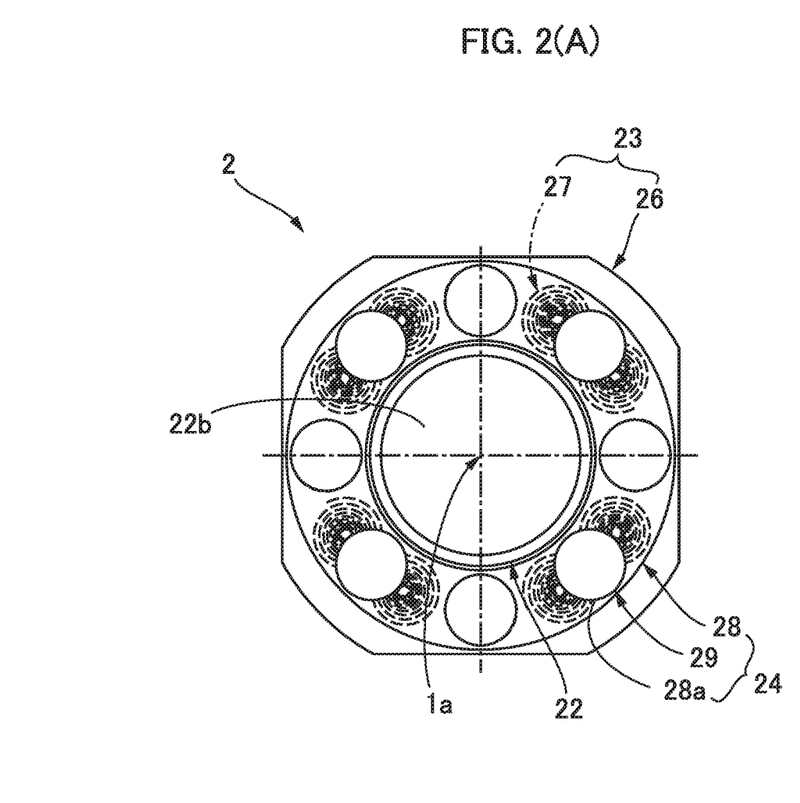
FIGS. 2(A) and 2(B) are front view and a perspective view showing a PWB motor of FIG. 1.
Figure 2B:
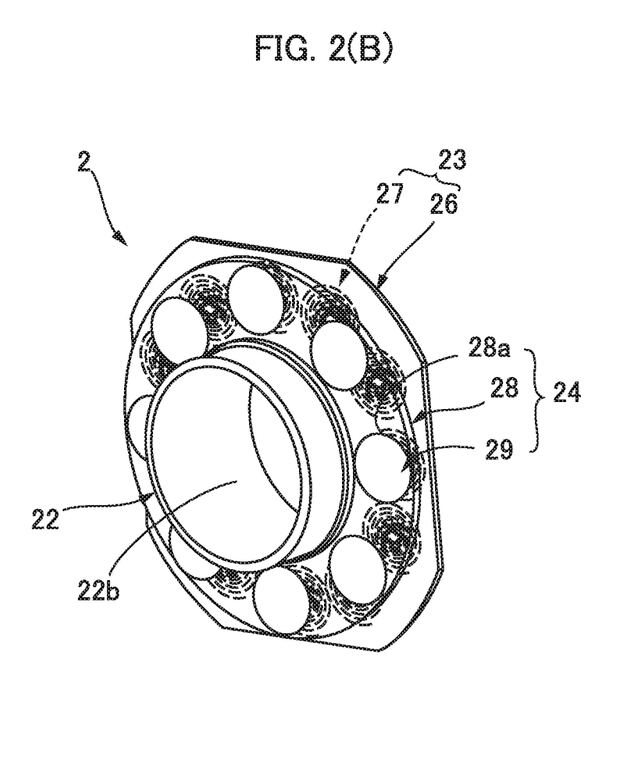

FIG. 2(A) is a schematic front view showing the PWB motor 2, and FIG. 2(B) is a schematic perspective view of the same. The following description is given with reference to FIGS. 1, 2(A) and 2(B). The motor stator 23 of the PWB motor 2 is provided with an insulating substrate 26 provided with a central hole through which the hollow motor shaft 22 passes in a state that allows rotation, and motor coils 27 (coreless coils) that are defined by a coil winding pattern formed from a copper foil formed on the insulating substrate 26. The insulating substrate 26 is secured to the housing 21. In the present example, the motor coils 27 are arranged in the surface of the insulating substrate 26 with equiangular spacing about the central axis 1a. For example, twelve motor coils 27 that form U, V, and W phases are arranged in the circumferential direction. The arrangement state, the arrangement number, the shape, etc., of the motor coils 27 are not limited to those of the example in the drawings.

The motor rotor 24 is provided with a rotor disc 28 of fixed plate thickness that is coaxially secured to the hollow motor shaft 22, and rotor magnets 29 that are attached to the rotor disc 28. The rotor magnets 29 are arranged with equiangular spacing about the central axis 1a. In the present example, eight round magnet fitting holes 28a are formed in the rotor disc 28 with equiangular spacing in the circumferential direction. The disc-form rotor magnets 29, which have greater plate thickness than the rotor disc 28, are fitted into the magnet fitting holes 28a. The arrangement state and the arrangement number of the rotor magnets 29 are not limited to those of the example in the drawings. The shape of the rotor magnets 29 is not limited to that of a disc, but rather may be quadrilateral, etc. Furthermore, bonding, press-fitting, and various other methods can be employed as the method of attachment.

The motor coils 27 of the motor stator 23 and the rotor magnets 29 of the motor rotor 24 face each other across a fixed gap in the direction of the central axis 1a. A motor magnetic circuit is thereby configured. A motor power line 5 is disposed through a wiring hole formed in the housing 21. The motor power line 5 is connected to a connector 6 mounted on the insulating substrate 26, and is connected via the connector 6 to a hard-wiring pattern (not shown) formed on the insulating substrate 26.

As described above, an axial-gap-type PWB motor 2 is used in the rotary actuator 1 of the present embodiment. The PWB motor 2 is configured from a motor stator 23 formed from an insulating substrate 26 on which a coil winding pattern is formed, and a motor rotor 24 formed from a rotor disc 28 to which rotor magnets 29 are attached. The axial length can be decreased and the hollow diameter thereof can be increased to a greater extent than in a rotary actuator of the prior art, in which a radial-gap-type SPM motor is used.

It is also possible to lower the number of components and the number of construction steps, as well as to reduce manufacturing costs, to a greater extent than in a typically used SPM motor. It is moreover unnecessary to use an insulator having a complicated shape in order to insulate the windings of salient poles. Furthermore, because no electromagnetic steel plates are used in the motor stator, there is no concern that cogging torque will be generated.

Furthermore, it is preferable to form a winding pattern from a copper foil on the surface or interior of the insulating substrate in the PWB motor 2, and therefore it is possible to easily form a highly precise winding pattern and to increase the winding space factor. The need for manual work, such as work for solder hard-wiring of the windings, is also obviated.

Furthermore, the power line and the wiring pattern can be connected via the connector mounted on the insulating substrate. This makes it possible to avoid having the insulating substrate and the wiring pattern be affected by damage to the power line.

Figure 3A:
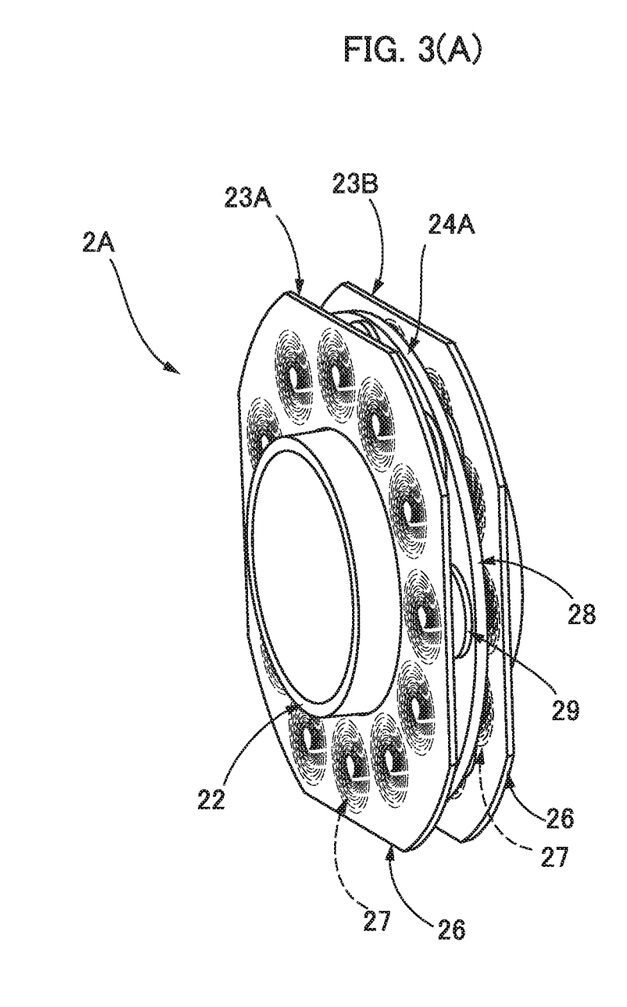
FIGS. 3(A) and 3(B) are perspective view and an exploded perspective view showing another example of the PWB motor.
Figure 3B:
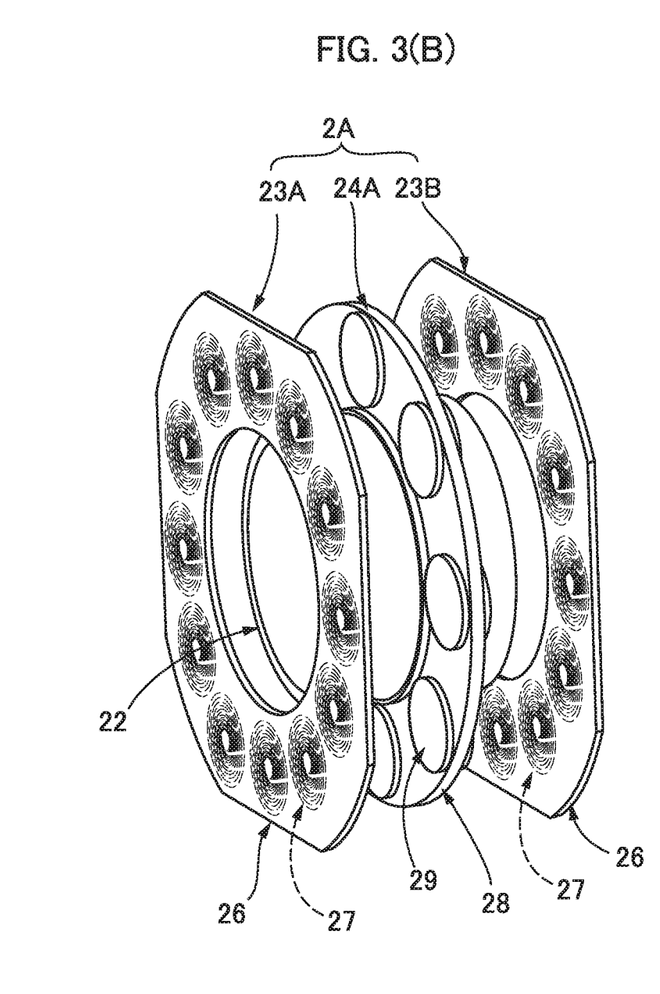

FIGS. 3(A) and 3(B) are schematic perspective view and a schematic exploded perspective view showing another example of the PWB motor 2. In the PWB motor 2A shown in these drawings, motor stators 23A, 23B are disposed on both sides in the direction of the central axis 1a, sandwiching a motor rotor 24A that is coaxially attached to the hollow motor shaft 22. The motor stators 23A, 23B have the same structure as the motor stator 23 described above and are disposed symmetrically sandwiching the motor rotor 24A. The motor rotor 24A also has the same structure as the motor rotor 24 described above. Using two motor stators 23A, 23B makes it possible to improve the motor output.

Second Embodiment

Figure 4:
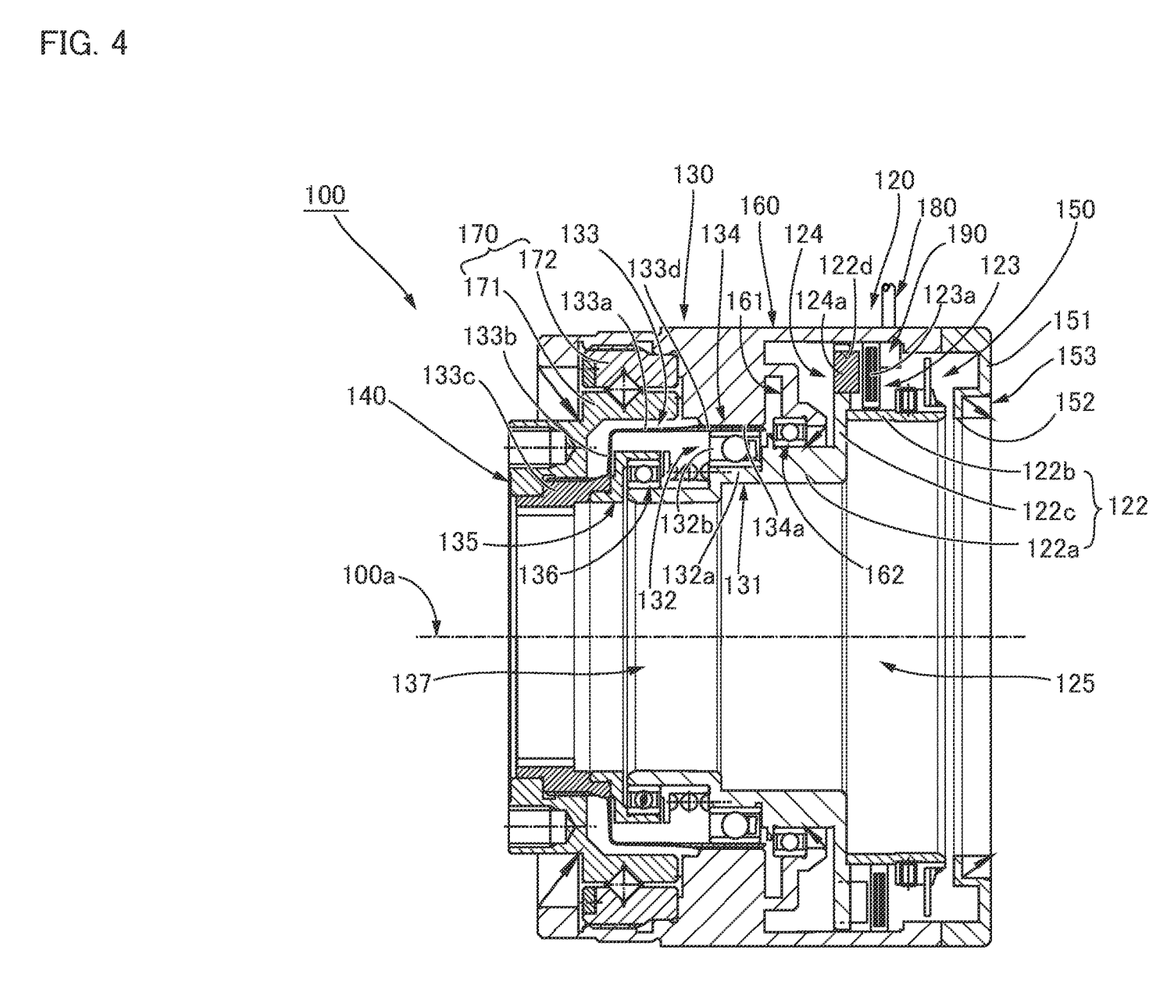
FIG. 4 is a longitudinal cross-sectional view showing a hollow rotary actuator according to second embodiment to which the present invention is applied.

FIG. 4 is a schematic longitudinal cross-sectional view showing a flat hollow rotary actuator according to second embodiment. The rotary actuator 100 is provided with a PWB motor 120, a wave gear drive 130 having a "cup" profile, an annular output shaft 140, and a rotary encoder 150 that detects rotation of the PWB motor 120. The rotary encoder 150 is disposed in an end (rear end) of a cylindrical housing 160 on the side toward the rear of the actuator (one side in the direction of a central axis 100a). The PWB motor 120 and the wave gear drive 130 are incorporated inside the housing 160 so as to be oriented toward the front of the actuator from the rear end of the housing 160, and the output shaft 140 is disposed at the front end of the housing 160. The output shaft 140 is rotatably supported by the housing 160 via a cross-roller bearing 170.

The PWB motor 120 is an axial-gap-type hollow motor and is provided with a hollow motor shaft 122, a motor rotor 124 assembled on the hollow motor shaft 122, and a motor stator 123 assembled on the housing 160. A portion of the hollow motor shaft 122 that is on the front side with respect to the direction of the central axis 100a constitutes a small-diameter shaft portion 122a, and a rear-side portion of the hollow motor shaft 122 constitutes a large-diameter shaft portion 122b. A rotor disc 122c that expands radially outward is formed integrally with the rear end of the small-diameter shaft portion 122a, and the front end of the large-diameter shaft portion 122b is coaxially and securely linked to the rotor disc 122c. The motor rotor 124 is provided with rotor magnets 124a that are attached to the rotor disc 122c at locations on the outer-peripheral side of the large-diameter shaft portion 122b. The motor stator 123 faces the rotor magnets 124a from the rear side in the direction of the central axis 100a with a very small gap interposed therebetween.

The rotary encoder 150 is assembled on the rear-side axial end section of the large-diameter shaft portion 122b of the hollow motor shaft 122. The rotary encoder 150 is covered by an encoder cover 151 attached to a rear-side open end of the housing 160. A motor hollow section 125 that is the hollow section of the hollow motor shaft 122 opens rearward from a central opening 152 in the encoder cover 151. An oil seal 153 is attached to the central opening edge of the encoder cover 151. The rear side of the motor hollow section 125 in the direction of the central axis 100a constitutes a large-diameter hollow section, and the front side of the motor hollow section 125 constitutes a small-diameter hollow section.

The wave gear drive 130 is provided with a hollow input shaft 131 formed integrally with the small-diameter shaft portion 122a on the front side of the hollow motor shaft 122, a wave generator 132 assembled on the outer peripheral surface of the hollow input shaft 131, a flexible externally toothed gear 133 having a "cup" profile, and an annular rigid internally toothed gear 134 formed integrally with the inner peripheral surface of the housing 160. A disc-form partition plate portion 161 is formed on the motor-side end surface of the internally toothed gear 134. The PWB motor 120 and the wave gear drive 130 are partitioned by the partition plate portion 161. Locations where the hollow input shaft 131 joins the hollow motor shaft 122 are rotatably supported by bearings 162 installed in the inner peripheral edge section of the partition plate portion 161.

The externally toothed gear 133 is provided with a cylindrical barrel part 133a that is capable of flexing in the radial direction, a disc-form diaphragm 133b extending radially inward from the rear end of the cylindrical barrel part 133a, a rigid annular boss 133c formed continuously and integrally with the inner peripheral edge of the diaphragm, and external teeth 133d formed on an outer peripheral surface portion on an opening-end side of the cylindrical barrel part 133a. The externally toothed gear 133 is a reduced-speed rotation outputting element, and the rigid boss 133c thereof is coaxially and securely linked to the output shaft 140. In the present example, the output shaft 140 is formed integrally with an inner ring 171 of the cross-roller bearing 170. An outer ring 172 of the cross-roller bearing 170 is securely linked to the housing 160.

The wave generator 132 is disposed on the inner side of the portion of the externally toothed gear 133 where the external teeth 133d are formed. The wave generator 132 is provided with: a plug portion 132a having an ellipsoidal contour, the plug portion 132a being formed integrally with the outer peripheral surface of the hollow input shaft 131; and a wave bearing 132b that is installed on the ellipsoidal outer peripheral surface of the plug portion 132a. The portion of the externally toothed gear 133 where the external teeth 133d are formed is flexed in an ellipsoidal shape by the wave generator 132. The external teeth 133d thereby mesh with internal teeth 134a of the internally toothed gear 134 at both long-axis-end positions of the ellipsoidal shape.

The front-end portion of the hollow input shaft 131 extends to near the boss 133c of the externally toothed gear 133. An annular bearing holder 135 is coaxially secured to the boss 133c. The front-end portion of the hollow input shaft 131 is rotatably supported by a bearing 136 installed in the bearing holder 135. A drive hollow section 137 passing through the central portion of the wave gear drive 130 is formed by a hollow section of the boss 133c, a hollow section of the bearing holder 135, and a hollow section of the hollow input shaft 131. The drive hollow section 137 communicates coaxially with the motor hollow section 125. An actuator hollow section extending through the rotary actuator 100 in the direction of the central axis 100a is formed by the motor hollow section 125 and the drive hollow section 137.

In the rotary actuator 100 having this configuration, rotation of the hollow motor shaft 122 of the PWB motor 120 is transmitted to the wave generator 132 via the hollow input shaft 131. When the wave generator 132 rotates, the positions at which the externally toothed gear 133 meshes with the internally toothed gear 134 move in the circumferential direction. The two gears 133, 134 undergo relative rotation that corresponds to the difference between the numbers of teeth of the two gears 133, 134. The externally toothed gear 133 rotates because the internally toothed gear 134 is a stationary-side member that is formed integrally with the housing 160. Rotation of the externally toothed gear 133 is outputted from the output shaft 140.

The PWB motor 120 is configured in the same manner as the PWB motor 2 shown in FIGS. 2(A) and 2(B). The motor stator 123 of the PWB motor 120 is provided with an insulating substrate 123a provided with a central hole through which the large-diameter shaft portion 122b of the hollow motor shaft 122 passes in a state that allows rotation, and motor coils (not shown) that are defined by a coil winding pattern formed from a copper foil formed on the insulating substrate 123a. The insulating substrate 123a is secured to the housing 160. The motor coils are arranged in the surface of the insulating substrate 123a with equiangular spacing about the central axis 100a. For example, twelve motor coils that form U, V, and W phases are arranged in the circumferential direction. The arrangement state, the arrangement number, the shape, etc., of the motor coils are not limited to those of the example in the drawings.

The motor rotor 124 is provided with rotor magnets 124a attached to the rotor disc 122c, which is of fixed thickness and is formed integrally with the small-diameter shaft portion 122a of the hollow motor shaft 122. The rotor magnets 124a are arranged with equiangular spacing about the central axis 100a. For example, eight round magnet fitting holes 122d are formed in the rotor disc 122c with equiangular spacing in the circumferential direction. The disc-form rotor magnets 124a, which have greater plate thickness than the rotor disc 122c, are fitted into the magnet fitting holes 122d. The arrangement state and the arrangement number of the rotor magnets 124a are not limited to those of the example in the drawings. The shape of the rotor magnets 124a is not limited to that of a disc, but rather may be quadrilateral, etc. Furthermore, bonding, press-fitting, and various other methods can be employed as the method of attachment.

The motor coils (not shown) of the motor stator 123 and the rotor magnets 124a of the motor rotor 124 face each other across a fixed gap in the direction of the central axis 100a. A motor magnetic circuit is thereby configured. A motor power line 180 is disposed through a wiring hole formed in the housing 160. The motor power line 180 is connected to a connector 190 mounted on the insulating substrate 123a, and is connected via the connector 190 to a hard-wiring pattern (not shown) formed on the insulating substrate 123a. A motor having the configuration shown in FIGS. 3(A) and 3(B) can also be used as the PWB motor 120.

As described above, an axial-gap-type PWB motor 120 is used in the rotary actuator 100. The axial length can be decreased and the hollow diameter thereof can be increased to a greater extent than in a rotary actuator of the prior art, in which a radial-gap-type SPM motor is used. In particular, the motor hollow section 125 can be increased in diameter. It is also possible to lower the number of components and the number of construction steps, as well as to reduce manufacturing costs, to a greater extent than in a typically used SPM motor. It is moreover unnecessary to use an insulator having a complicated shape in order to insulate the windings of salient poles. Furthermore, because no electromagnetic steel plates are used in the motor stator, there is no concern that cogging torque will be generated.

Furthermore, it is preferable to form a winding pattern from a copper foil on the surface or interior of the insulating substrate 123a in the PWB motor 120, and therefore it is possible to easily form a highly precise winding pattern and to increase the winding space factor. The need for manual work, such as work for solder hard-wiring of the windings, is also obviated. Furthermore, the power line and the wiring pattern can be connected via the connector 190 mounted on the insulating substrate 123a. This makes it possible to avoid having the insulating substrate 123a and the wiring pattern be affected by damage to the power line.

(Multi-Axial Rotary Actuator)

As mentioned previously, the PWB motor 120 in the rotary actuator 100 is an axial-gap-type motor. Because it is unnecessary to line up constituent components in the radial direction, it is easy to increase the hollow diameter of the motor hollow section 125. For example, the hollow diameter of the large-diameter hollow section of the motor hollow section 125, which is open at the rear end, is easily set to be greater than the outside-diameter dimensions of the front-end portion of the output shaft 140, which is disposed at the front end. Setting the dimensions in this manner makes it possible to coaxially link rotary actuators 100 in the axial direction and configure a multi-axial rotary actuator.

Figure 5:
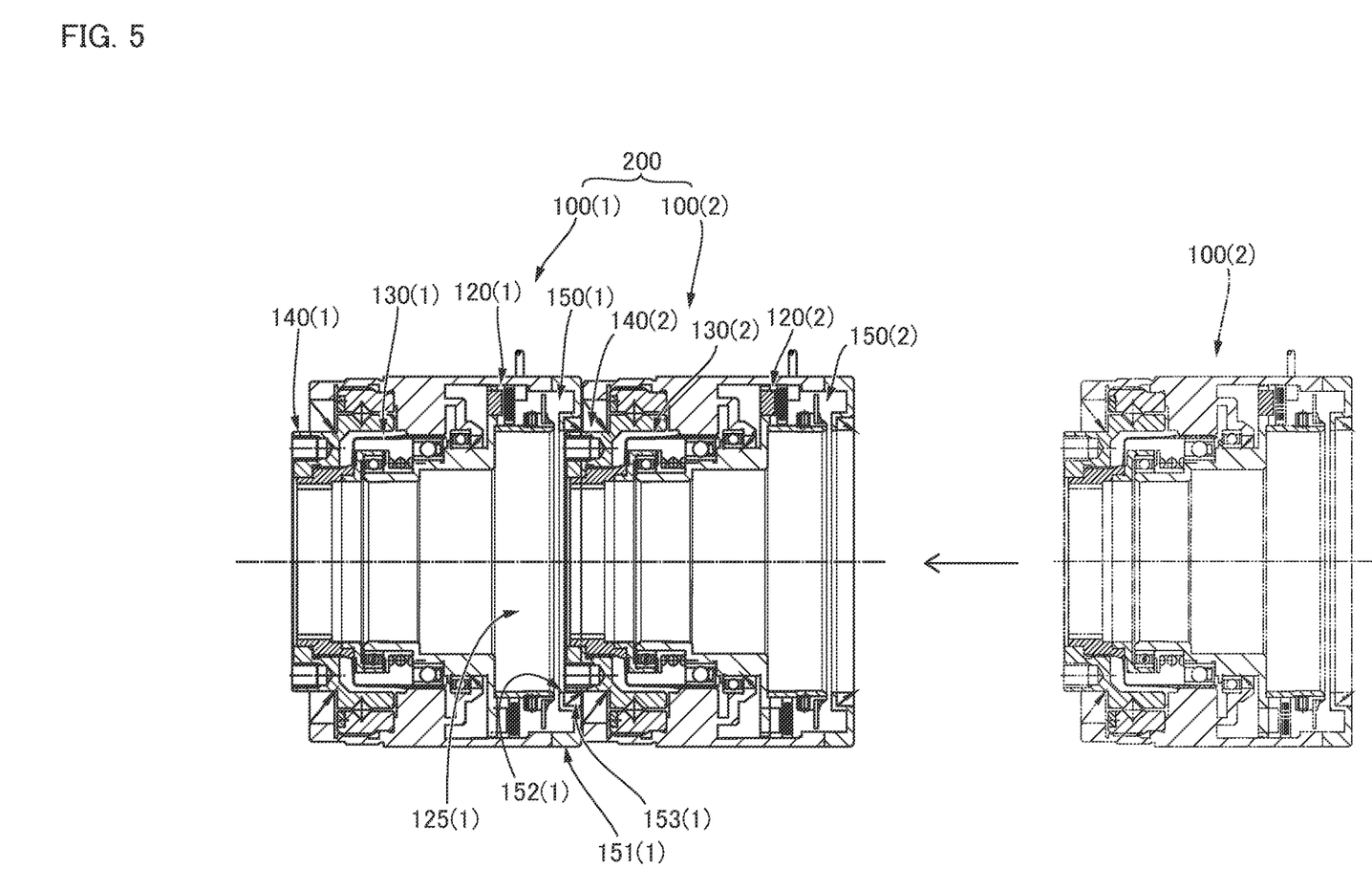
FIG. 5 is a longitudinal cross-sectional view showing an example of a biaxial rotary actuator.

FIG. 5 is a schematic longitudinal cross-sectional view showing a biaxial rotary actuator 200 having a configuration in which rotary actuators 100(1), 100(2) of the same size and the same configuration are linked in the axial direction. The preceding-stage rotary actuator 100(1) and the subsequent-stage rotary actuator 100(2) are of the same size and structure as the rotary actuator 100 described above, and therefore the structures thereof are not described here. The front-end portion of the output shaft 140(2) of the subsequent-stage rotary actuator 100(2) is coaxially inserted, in a state that allows rotation, into the motor hollow section 125(1) that is open at the rear end of the preceding-stage rotary actuator 100(1). In this state, the two rotary actuators 100(1), 100(2) are securely linked. A space between the inner peripheral edge section of the central opening 152(1) in the encoder cover 151(1) by which the rear-end portion of the motor hollow section 125(1) is defined and the outer peripheral surface of the subsequent-stage output shaft 140(2) is sealed by the oil seal 153(1) attached to the encoder cover 151(1).

Coaxially linking the rotary actuators 100(1), 100(2) of the same size makes it possible to dispose the preceding-stage output shaft 140(1) and the subsequent-stage output shaft 140(2) on the same axis. Similarly, coaxially linking three or more rotary actuators 100 of the same size makes it possible to configure a multi-axial rotary actuator.

In the biaxial rotary actuator 200 or the multi-axial rotary actuator, a hollow section having a large inside diameter is formed extending through the center thereof. The hollow section can be used as a space for passage of large amounts of wiring or piping. The hollow section can also be used as a space for establishing a ball screw or another motive power transmission member. The hollow section can furthermore be used as an optical path for laser light, etc.

Figure 6:
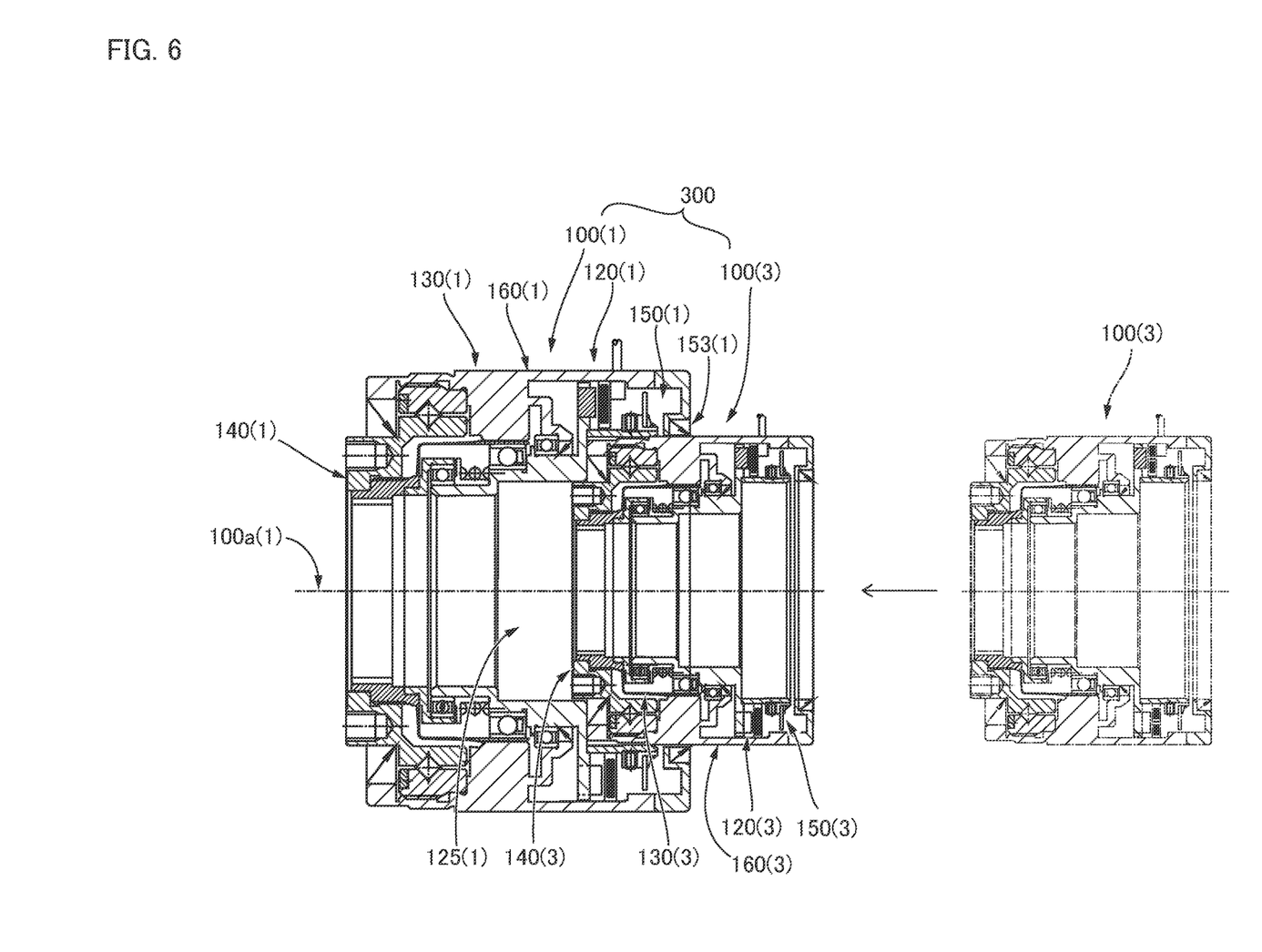
FIG. 6 is a longitudinal cross-sectional view showing another example of a biaxial rotary actuator.

FIG. 6 is a schematic longitudinal cross-sectional view showing a biaxial rotary actuator 300 having a configuration in which rotary actuators 100(1), 100(3) of different sizes but the same configuration are linked in the axial direction. The rotary actuator 100(1) is of the same size and configuration as the rotary actuator 100 described above. The rotary actuator 100(3) is of the same configuration as the rotary actuator 100 but is one size smaller. In the present example, the outside-diameter dimensions of the housing 160(3) of the rotary actuator 100(3) are set to be smaller than the inside-diameter dimensions of the large-diameter hollow section on the rear side of the motor hollow section 125(1) of the rotary actuator 100(1). In addition, the outside-diameter dimensions of the front-end portion of the output shaft 140(3) of the rotary actuator 100(3) are set to be smaller than the inside-diameter dimensions of the small-diameter hollow section on the front side of the motor hollow section 125(1) of the rotary actuator 100(1).

As shown in FIG. 6, the rear-side rotary actuator 100(3), which is smaller in size, is inserted in a coaxial state from the rear-end-opening side of the motor hollow section 125 (1) of the front-side rotary actuator 100(1), which is larger in size. In this state, the housings of the two rotary actuators 100(1), 100(3) are linked together. A space between the two rotary actuators 100(1), 100(3) is sealed by the oil seal 153(1). This makes it possible to configure a biaxial rotary actuator 300 having a short axial length.

The invention claimed is:

1. A rotary actuator, comprising a motor and a wave gear drive that is linked to the motor so as to reduce speed of output rotation of the motor and output reduced-speed rotation, wherein
the motor is an axial-gap-type motor provided with a motor shaft, and with a motor rotor and a motor stator that face each other across a fixed spacing in a direction of a central axis of the motor shaft;
the motor rotor is provided with a rotor disc that is coaxially secured to the motor shaft, and rotor magnets that are secured to the rotor disc; and
the motor stator is provided with an insulating substrate, and motor coils that are defined by printed wiring formed on a surface or interior of the insulating substrate,
wherein
the motor shaft is a hollow motor shaft that extends through a central portion of the motor in the direction of the central axis,
a hollow section of the hollow motor shaft defines a motor hollow section,
the wave gear drive is provided with a drive hollow section that extends through the wave gear drive in the direction of the central axis,
the drive hollow section communicates coaxially with the motor hollow section,
the drive hollow section opens toward an actuator front side that is one side in the direction of the central axis, and
the motor hollow section opens toward an actuator rear side that is the other side in the direction of the central axis.

2. The rotary actuator according to claim 1, wherein
the wave gear drive is provided with: a rigid internally toothed gear; a flexible externally toothed gear that is coaxially disposed inside the internally toothed gear; a wave generator that is installed inside the externally toothed gear and flexes the externally toothed gear into an ellipsoidal shape so that the externally toothed gear partially meshes with the internally toothed gear; a hollow input shaft that rotates integrally with the hollow motor shaft; and a hollow output shaft that outputs reduced-speed rotation,
the wave generator is provided with a rigid plug having an ellipsoidal outer peripheral surface, and a wave bearing installed between the ellipsoidal outer peripheral surface and the externally toothed gear,
the rigid plug is coaxially secured to an outer peripheral surface of the hollow input shaft or is integrally formed on the outer peripheral surface thereof,
one of the internally toothed gear and the externally toothed gear is a stationary-side member, and the other is an driven-side member, and
the hollow output shaft is coaxially and securely linked to the drive-side member.

3. The rotary actuator according to claim 2, wherein
the hollow output shaft is disposed at an actuator-front-side end, and
inner-diameter dimensions of the motor hollow section and outer-diameter dimensions of the hollow output shaft are set so that the hollow output shaft can be inserted into the motor hollow section from the actuator rear side.

4. The rotary actuator according to claim 3, further comprising:
a cylindrical housing; and
a bearing that supports the externally toothed gear in a state that allows relative rotation with respect to the internally toothed gear,
wherein
the motor and the wave gear drive are installed into the housing,
the internally toothed gear is the stationary-side member and is integrally formed on the housing or is secured to the housing,
the externally toothed gear is the driven-side member and is provided with a cylindrical barrel part, a diaphragm extending inward in a radial direction from one end of the cylindrical barrel part, and an annular boss continued from and formed on an inner peripheral edge of the diaphragm,
the boss is coaxially and securely linked to the hollow output shaft, and
the hollow output shaft is supported in a rotatable state by the housing via the bearing.

* * * * *